May 4, 1948.  F. H. LE JEUNE  2,440,862
WHEEL
Filed April 6, 1944

Inventor
FRANK H. LE JEUNE
By Beaman & Langford
Attorneys

Patented May 4, 1948

2,440,862

UNITED STATES PATENT OFFICE 2,440,862

WHEEL

Frank H. Le Jeune, Jackson, Mich., assignor, by mesne assignments, to The B. F. Goodrich Company, Akron, Ohio, a corporation of New York Application April 6, 1944, Serial No. 529,749

3 Claims. (Cl. 301—62)

The present invention relates to improvements in wheel construction, having particular reference to wheels having wide base rims, as for example used on aircraft.

One of the objects of the present invention is to make an inexpensive wheel construction capable of meeting aircraft specifications and of improved structural design.

Another object of the invention is to provide an improved wheel construction combining sheet metal and forged structural parts.

Other objects and advantages of the present invention will be found in the details of construction and the combination and arrangement of the associated parts going into the wheel construction, all as will more fully appear from a consideration of the following specification and annexed claims.

Figure 1:
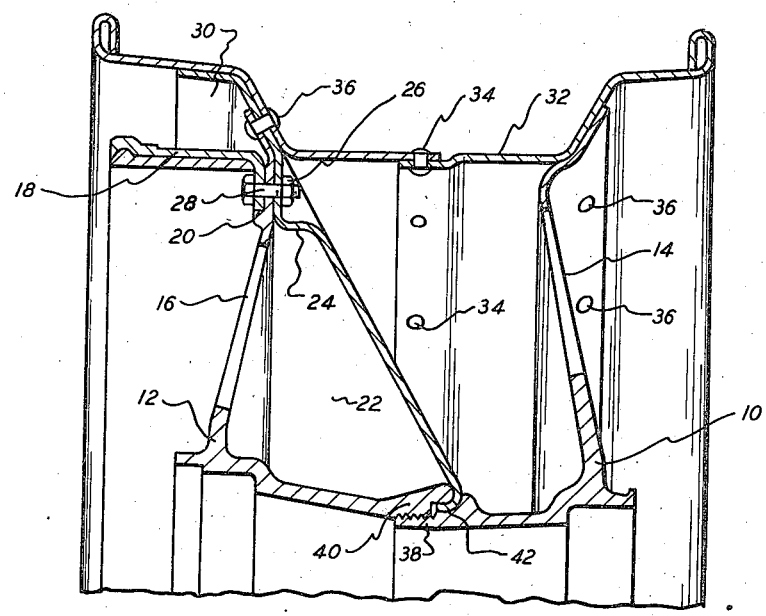
Figure 2:
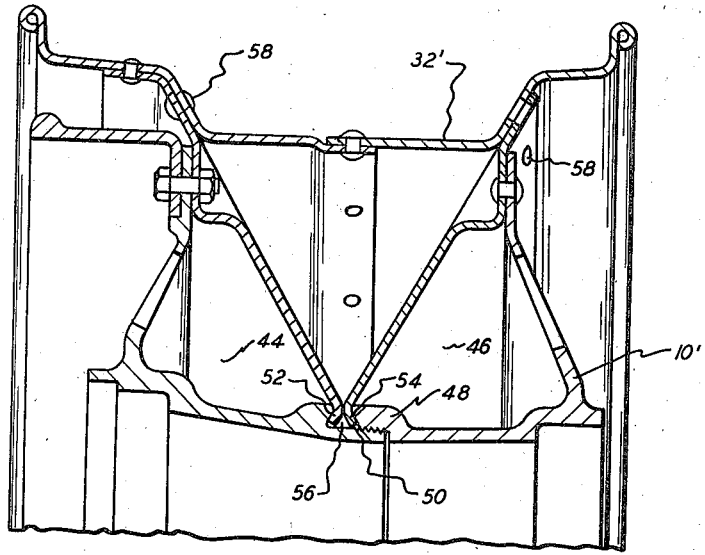

In the drawing where two different forms of the wheel construction embodying the principles of construction of the present invention are illustrated, Fig. 1 is a fragmentary cross sectional view of a wheel construction showing one form of the invention, and Fig. 2 is a view similar to Fig. 1 of another form of the invention.

As shown in Fig. 1, the hub of the wheel consists of two parts 10 and 12, which are preferably in the form of steel forgings having radial flanges 14 and 16 shown as of tapered construction. The composite brake drum 18 is shown piloted upon an annular shoulder 20. A frusto-conical sheet metal diagonal brace member 22 has circumferentially spaced bosses 24. Nuts 26 may be welded in position to threadably receive bolts 28 for supporting the brake drum 18 from the flange 16. The member 22 is shown extended beyond the brake drum as at 30 to offer reinforcement to that portion of the sheet metal rim 32 which overhangs the brake drum 18.

The rim 32 as shown is of drop center construction and is fabricated from rolled sheet metal sections riveted together as at 34. The flanges 14 and 16 are shown riveted to and supporting the rim as at 36.

The means illustrated for anchoring the diagonal bracing member 22 to the hub 10 comprises interthreaded portions 38 and 40, which engage and clamp the turned edge portion 42 of the member 22.

In the modified form of the invention shown in Fig. 2, the hub 10' and the rim 32' may correspond in construction to that shown in Fig. 1. In lieu of the single diagonal bracing member 22 of Fig. 1, in the construction shown in Fig. 2, a pair of sheet metal frusto-conical members 44 and 46 are anchored to the central portion of the hub 10' through threaded engagement of the portions 48 and 50 clamping the turned edge portions 52 and 54 within the annular channel 56 within a restricted throat. Rivets or other suitable means 58 are provided for assembling the parts.

The improved construction is particularly adapted for wheels having a broad rim construction, such as used in aircraft subjected to extreme loads, yet which by necessity must be of light construction. While forgings are preferably used in combination with the sheet metal parts disclosed, it should be obvious that other forms of fabrication can be employed.

One of the principal advantages of the construction shown in Figs. 1 and 2 is found in the possibility of using advantageous angles on the conical bases 22, 44 and 46 by being able to fasten them into the hub of the wheel at the center between the bearings. By screwing the two hub parts together, it is possible to assemble these conical bases whereas with any other type of construction it would be exceedingly difficult.

Having thus described my invention, what I desire to secure by Letters Patent and claim is:

1. An aircraft wheel of high radial load capacity comprising a wide base rim, a two-part hub having a central joint, opposed conical members connecting the outer ends of said hub with intermediate portions of said rim, and a conical strut member extending between an intermediate point on said rim and being connected to said hub at said joint.

2. A wheel of high radial load capacity comprising a two-part hub piloted one upon the other at inner opposed ends, a rim, radial load supporting members extending from opposite ends of said hub to said rim, and a diagonal structural member extending between said hub and rim and received between said hub parts adjacent their points of piloting.

3. A wheel structure of high radial load capacity comprising a pair of flanged hub parts, means for threadably engaging said parts at their central opposed end portions, a rim supported from said hub flanges, a diagonal structural member clamped between said hub parts and extending towards said rim.

FRANK H. LE JEUNE.

REFERENCES CITED

The following references are of record in the file of this patent:

UNITED STATES PATENTS

| Number | Name | Date |
|---|---|---|
| 931,403 | Fleming | Aug. 17, 1909 |
| 1,461,889 | Burrows | July 17, 1923 |
| 1,640,573 | Laddon et al. | Aug. 30, 1927 |
| 2,041,457 | Cautley | May 19, 1936 |
| 2,048,443 | Frank | July 21, 1936 |
| 2,105,317 | Frank | Jan. 11, 1938 |
| 2,173,584 | Frank | Sept. 19, 1939 |
| 2,230,193 | Shinn | Jan. 28, 1941 |